Aug. 16, 1927.  L. H. KING  1,639,092
DUMPING TRUCK
Filed Nov. 4, 1921  8 Sheets-Sheet 7

Witnesses:  Inventor,
Landreth H. King,
By
Attorneys.

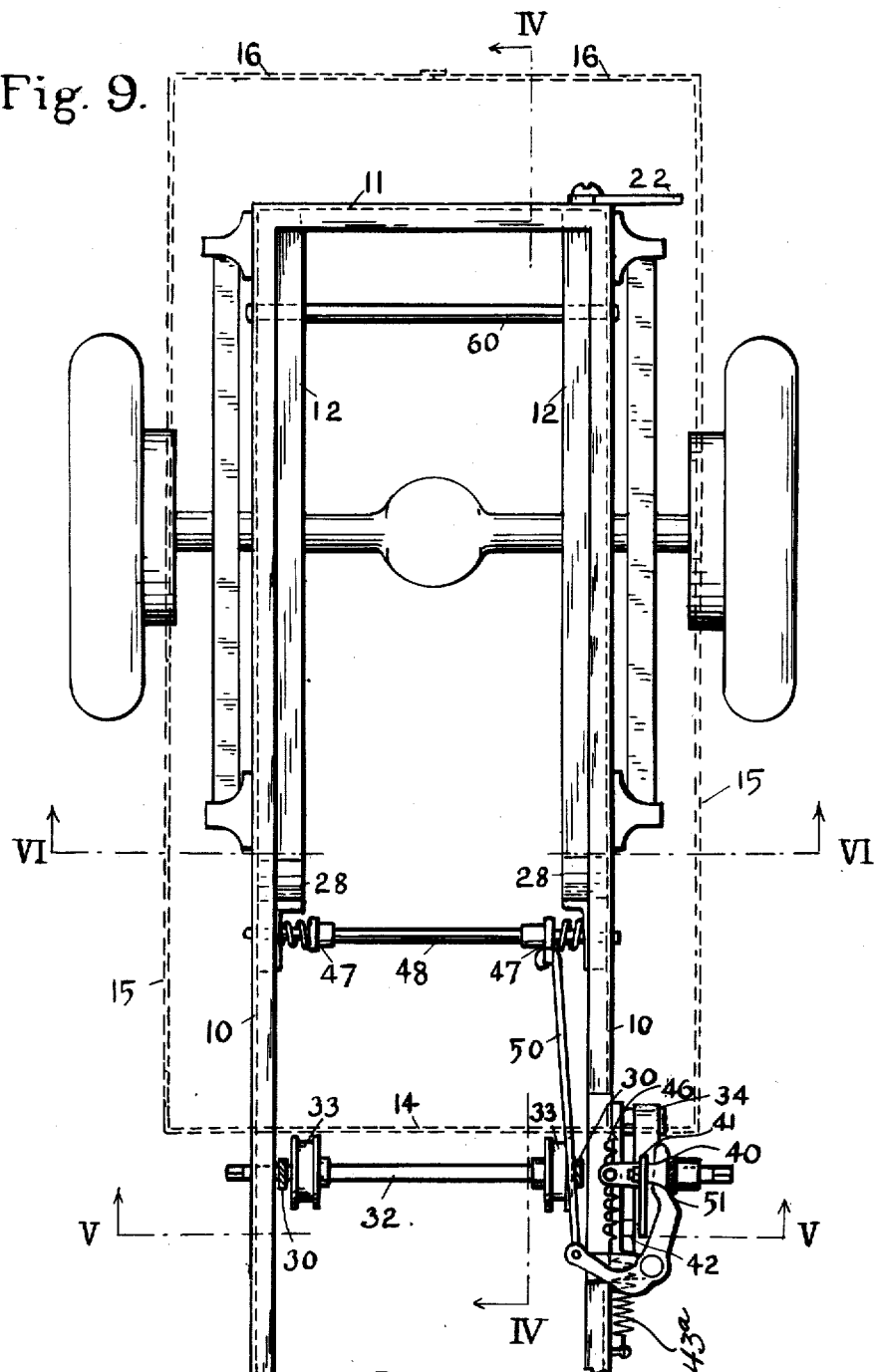

Patented Aug. 16, 1927.

1,639,092

UNITED STATES PATENT OFFICE.

LANDRETH H. KING, OF ORANGE, NEW JERSEY, ASSIGNOR TO KING MECHANISM. AND ENGINEERING COMPANY, OF NEW YORK, N. Y., A CORPORATION OF NEW YORK.

DUMPING TRUCK.

Application filed November 4, 1921. Serial No. 512,781.

This invention relates to trucks organized for dumping preferably though not necessarily to the rear. It is not material to the invention as to the motive power of the vehicle to which it is applied, as for example, animal driven or power driven; nor is it material as to the character of the roadway to which the vehicle is adapted, as for example, a rough farm road, a highway for rubber tired wheels, or a railway for flanged steel wheels.

The object of this invention is to provide a dump truck in which the body, supported on rockers, is so balanced that ordinarily when released it will dump its load by gravity and after dumping will be returned to its normal loading position also by gravity.

A further object of the invention is to effect the dumping at a considerable distance from the truck, this object being effected by providing the rockers with long radii.

A further object is to provide means whereby the speed of dumping and of returning to normal position can be regulated and whereby the body can be held in any position. In connection with this regulating means provision is also made for applying manual power to effect the dumping or returning which may or may not be employed as occasion demands.

A further object is to provide securing means for maintaining the body in load carrying position and to provide connections by which the same are released previously to the regulating means above referred to. As to the objects above recited the invention provides means whereby the control of the body may be had by the driver without leaving his seat.

A further object is to provide connections between the body and the rockers so that the rockers may be folded toward the floor of the body and the body converted to and carried at a lower position when the automatic dumping feature is not desired.

A further object is to provide means for supporting the body in its dumping position independently of the rocker whereby the rockers are free from the weight of the body and to provide accessible means for folding the rockers beneath the body.

A further object is to provide means for automatically guiding the body when lowered from or raised to dumping position with the rockers folded whereby the body is suitably positioned upon being converted from the one use to the other.

A further object is to provide for the conversion from a box body to a platform body and for utilizing the sides of the box body as side extensions of the platform.

In the accompanying eight sheets of drawings which form a part of this specification an embodiment of the invention is shown in connection with a portion of an automobile truck chassis, but it is to be understood that this is for convenience of illustration and that no limitation of the invention is to be inferred therefrom. In these drawings:—

Fig. 9 is a plan of the truck frame, the location of the body in relation thereto in either loading position being indicated in dotted lines and the cable frame being in section on the lines IX—IX of Figs. 1, 4, 5, 6 and 7.

Figure 1:
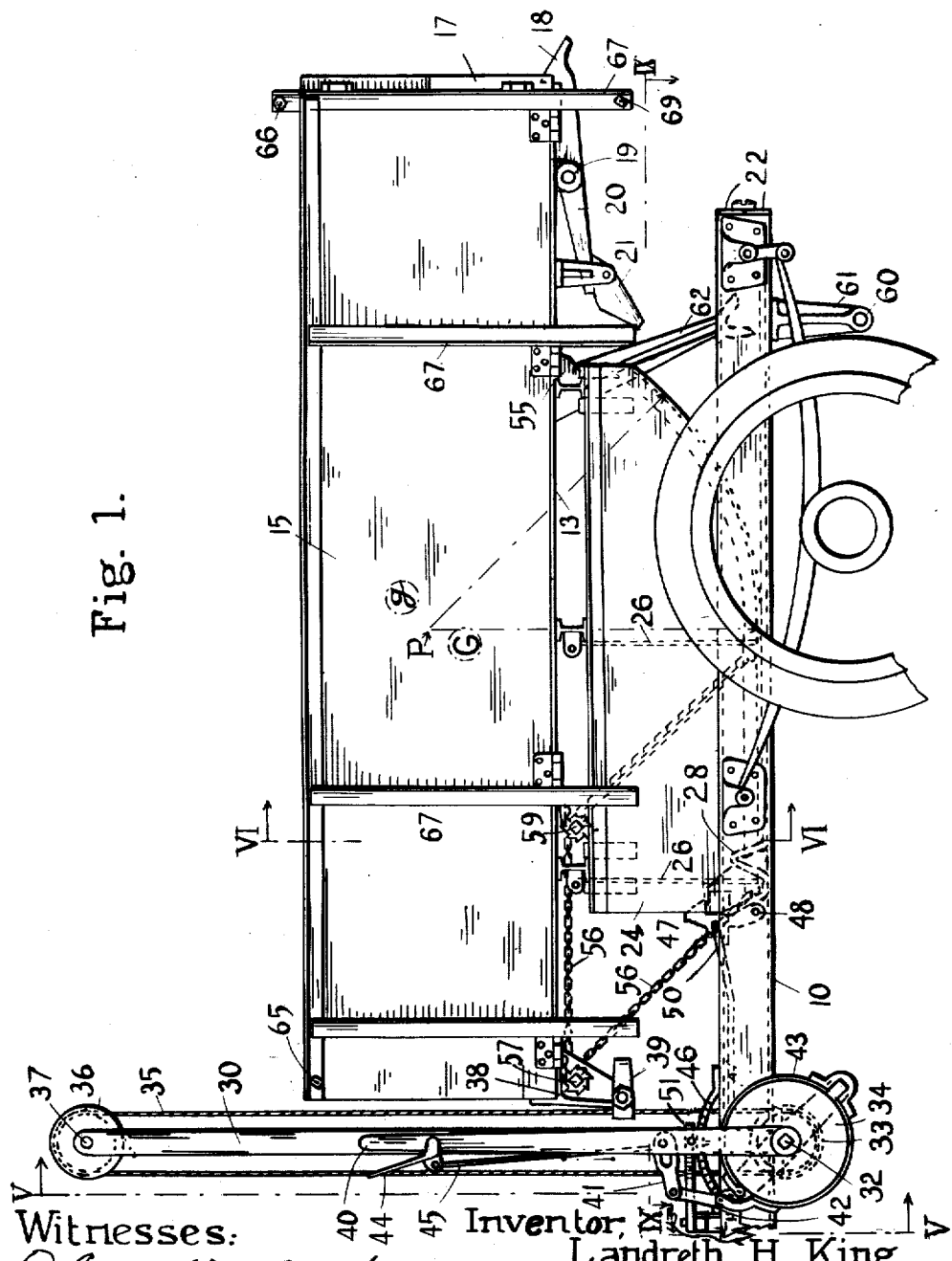
Figure 1 is a side elevation of a dumping truck which embodies this invention and illustrates the same in the upper loading position, the forward portion with the chauffeur's seat and the power plant being omitted.

Referring now to the particular construction chosen for illustration, advantage is taken of the parallel inwardly faced channel members 10, 10 and rear connecting member 11 present in an automobile truck frame of usual form. Trackways 12, 12 extending from the lower flanges of the side members support a body consisting of a floor 13, a front plate 14, and side plates 15, 15. The rear of the body comprises two doors 16, 16 hinged to the side plates and overlapping at the middle. These are suitably braced by diagonal cross braces 17, 17 so that they may be secured by a single rearwardly extending latch 18 at the overlapping portions.

Figure 2:
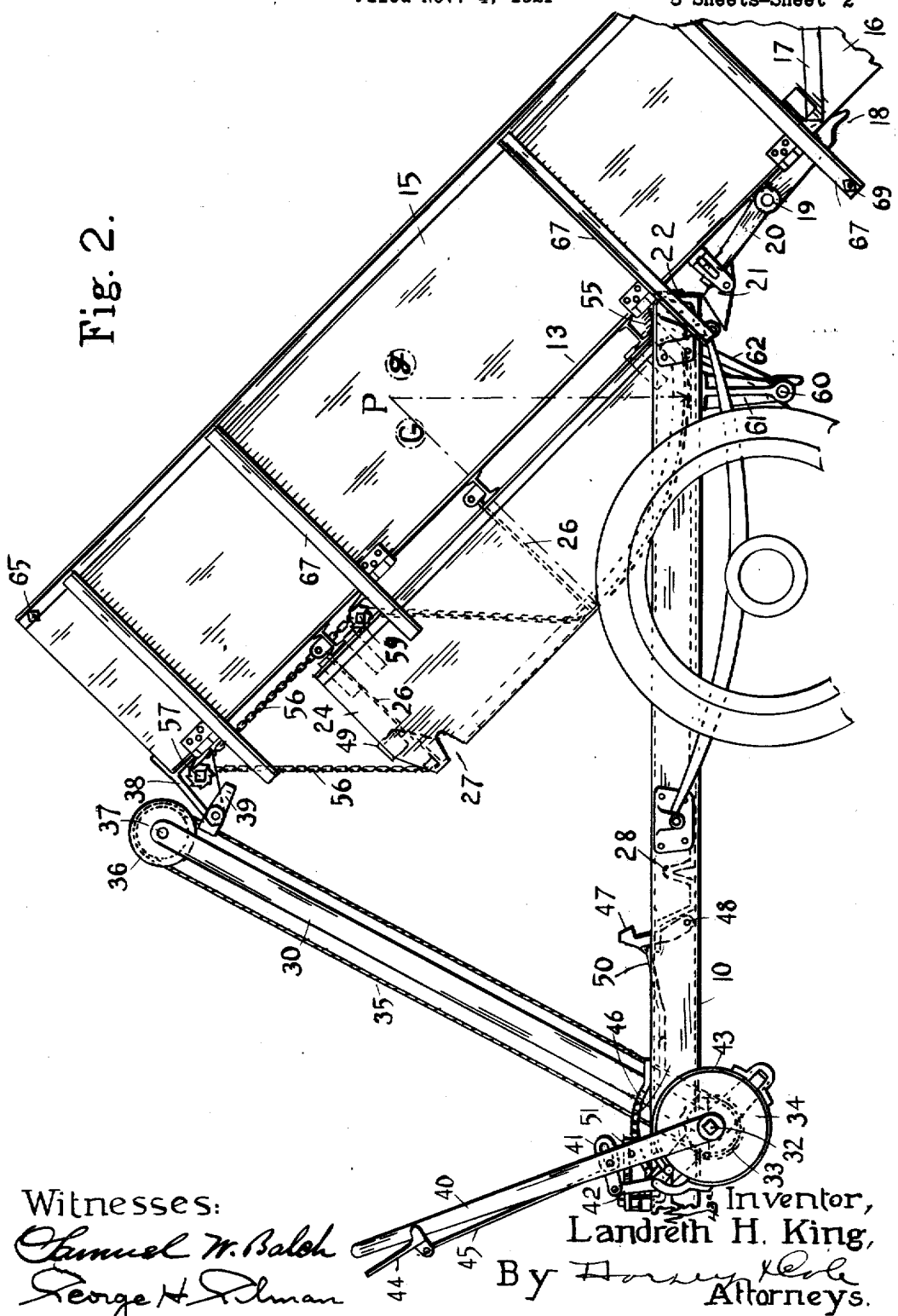
Fig. 2 is a side elevation showing the same in dumping position.
Figure 8:
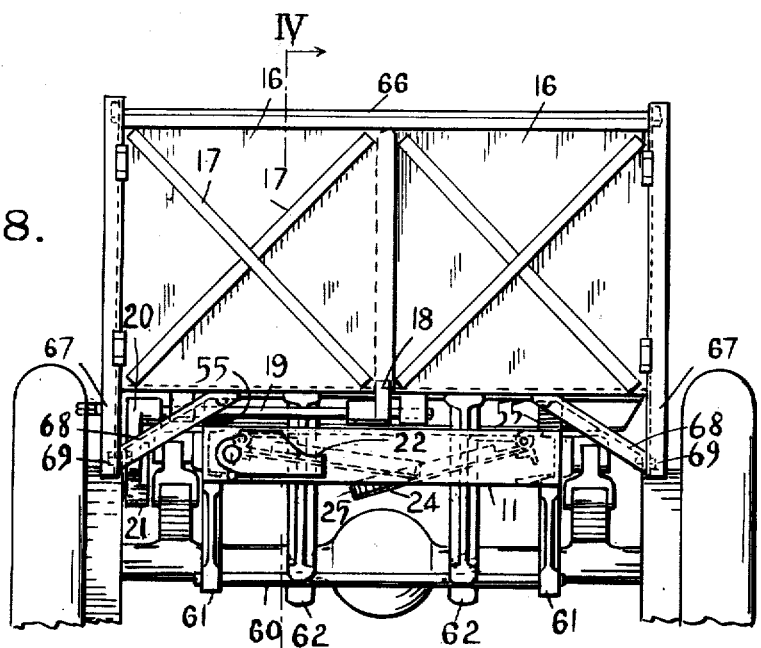
Fig. 8 is a rear elevation showing the body in the lowered position of Fig. 3 and the rockers folded.

This latch, normally maintained in latching position by gravity, is rigidly mounted on a shaft 19, and is moved to unlatching position by a forwardly extending lever 20 located at the side of the body and also rigidly mounted on the said shaft. The forward end of the lever engages a cam 21 pivoted to the side of the car body which cam strikes a projection 22 from the truck frame to trip the latch while the body is being tilted, thus permitting the doors to open. It will be observed that in completed dumping position the cam is below and clears the projection; see Fig. 2. The projection is shown as being pivotally connected with the rear bar of the truck frame so that it may be turned to the position shown in Fig. 8 when not in use if desired.

Depending from the body are rockers consisting of plates 24, 24 reinforced on the lower edges with curved angle irons 25, 25. The rockers are hinged to the floor of the body and are capable of being folded toward each other, but are normally held parallel by one or more braces 26, 26 between the rockers of any suitable type, being illustrated in the form of transverse plates. The rear portions of the rockers are curved with a point P as the center of curvature which is located above and preferably to the rear of the center of gravity G of the rockers and body when not loaded, and also preferably low enough to be below and forward of the center of gravity $g$ of the rockers and body together with its load. The rockers follow the circle only to the rear of a vertical line from the center P, and forward of this line are parallel with the floor of the body. The trackways 12, 12 for the rockers are located on as low a line as possible so that the radius of curvature of the rockers may be long without unduly elevating the body and keeping the location of the centers as above defined. In consequence not only is gravity dumping and return provided for but in dumping the body will be carried rearwardly and will discharge its contents at a considerable distance from the truck. The rockers are provided each with a notch 27 for engagement with a corresponding corrugation 28 in each of the trackways to prevent forward and rear sliding of the rockers and body on the trackways. The system of relatively curved rockers and trackways set out above, which effect a gravity dump and return of the body, embodies one form of means whereby the dumping body is caused to move from one position to another.

The trackways comprise strips of sheet metal riveted to the lower flanges of the side members and extending along the side members for such distance as is required for the rockers. At the forward ends the trackways are bent upward to brace and strengthen them and to cooperate with the corrugations just mentioned in preventing forward displacement of the body and rockers, but these portions are narrowed sufficiently to clear the braces when the latter are folded upward as will later be explained.

Mounted on the truck frame at the front of the body is a cable carrier comprising one or more uprights 30, 30. These are pivotally carried on the truck frame by hangers 31, 31 which support a shaft 32 upon which the uprights are rotatably mounted. This shaft has rigidly attached thereon cable-drums 33, 33 and a brake-drum 34. The ends of the shaft project beyond the hangers and are squared so that a crank can be applied thereto for manual operation. Cables 35, 35, the ends of which are attached to their respective drums, lead over sheaves 36, 36 rotatably mounted on a shaft 37 which connects the upper ends of the uprights. Brackets 38, 38 are attached to the forward corners of the body and clamps 39, 39 pivoted thereto engage the cables. The cable system, set out above, through which a manual operation of the body may be effected, embodies another form of means whereby the dumping body is caused to move from one position to another.

A brake-lever 40 through a slack motion link 41, and a lever 42 spring biased as at 43ª in brake applying position, expands and closes a brake-strap 43 which surrounds the brake-drum. The brake-lever has a latch handle 44 from which a rod 45 leads to an arc 46 with notches which are engaged thereby to hold the lever in any operated position. Normally the brake-lever is locked positively to maintain the brake-strap in tight engagement upon the brake-drum so as to prevent tilting of the body. It is the arrangement above described which comprises what has been referred to in the statement of objects of the invention as the regulating means.

The means for securing the body in its load carrying position which it will be observed cooperate with the regulating means comprise positive latches 47, 47, spring biased in locking position. These are rigidly mounted on a rod 48 supported between the side members of the truck frame and engage lugs 49, 49 on the inner sides of the rockers. A rod 50 from one of the latches connects with a bell-crank 51, one branch of which has a cam face. This is engaged by the side of the brake-lever during the first part of its forward travel to release the brake and retracts the latches moving the same forwardly sufficiently for all clearance purposes. The first part of the forward travel of the brake-lever, however, does not release the brake by reason of lost motion provided in the link 41 between the brake-lever and the brake mechanism, so that the latches are withdrawn and the brake released at successive positions of the brake-lever.

Figure 3:
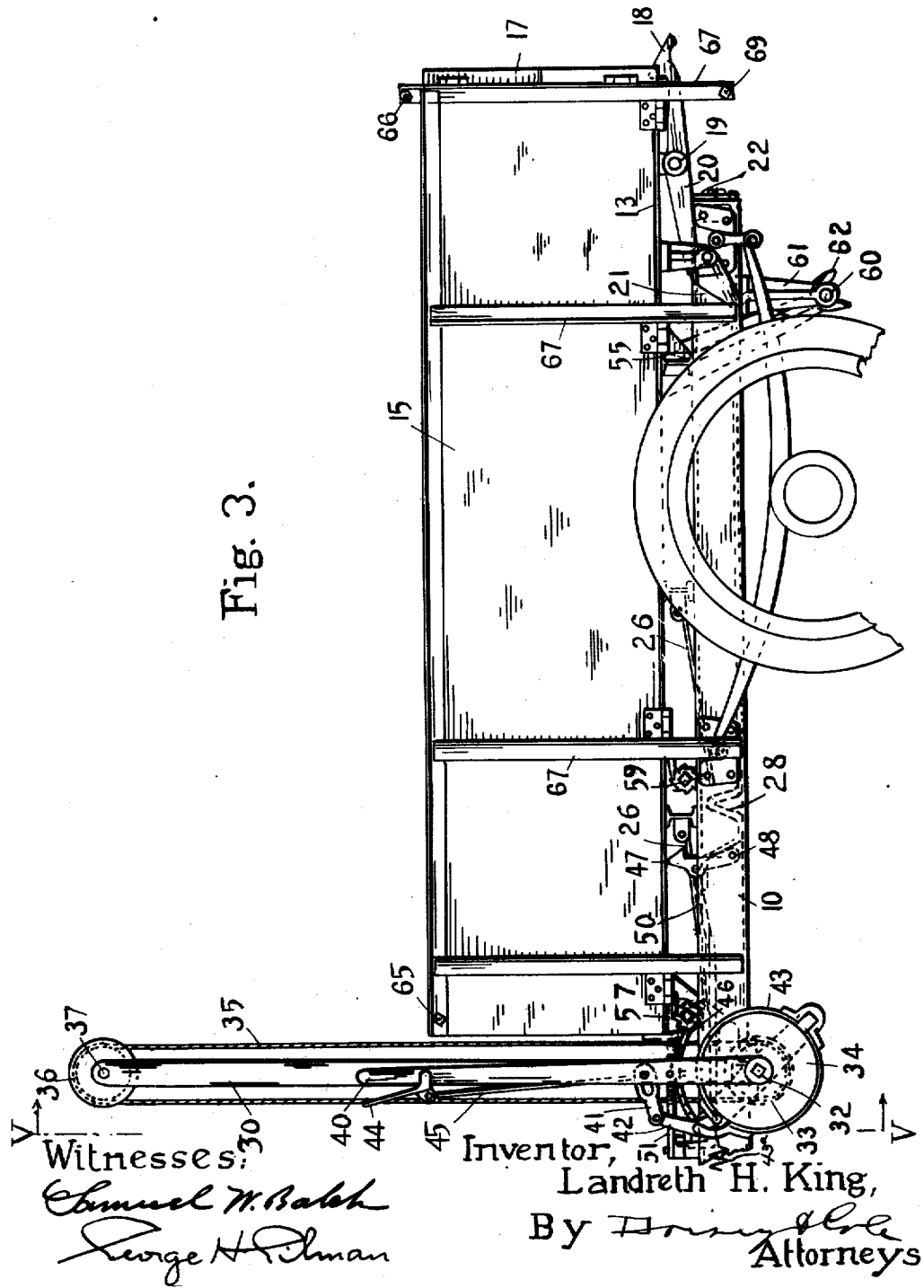
Fig. 3 is a side elevation showing the body in its lower loading position.
Figure 4:
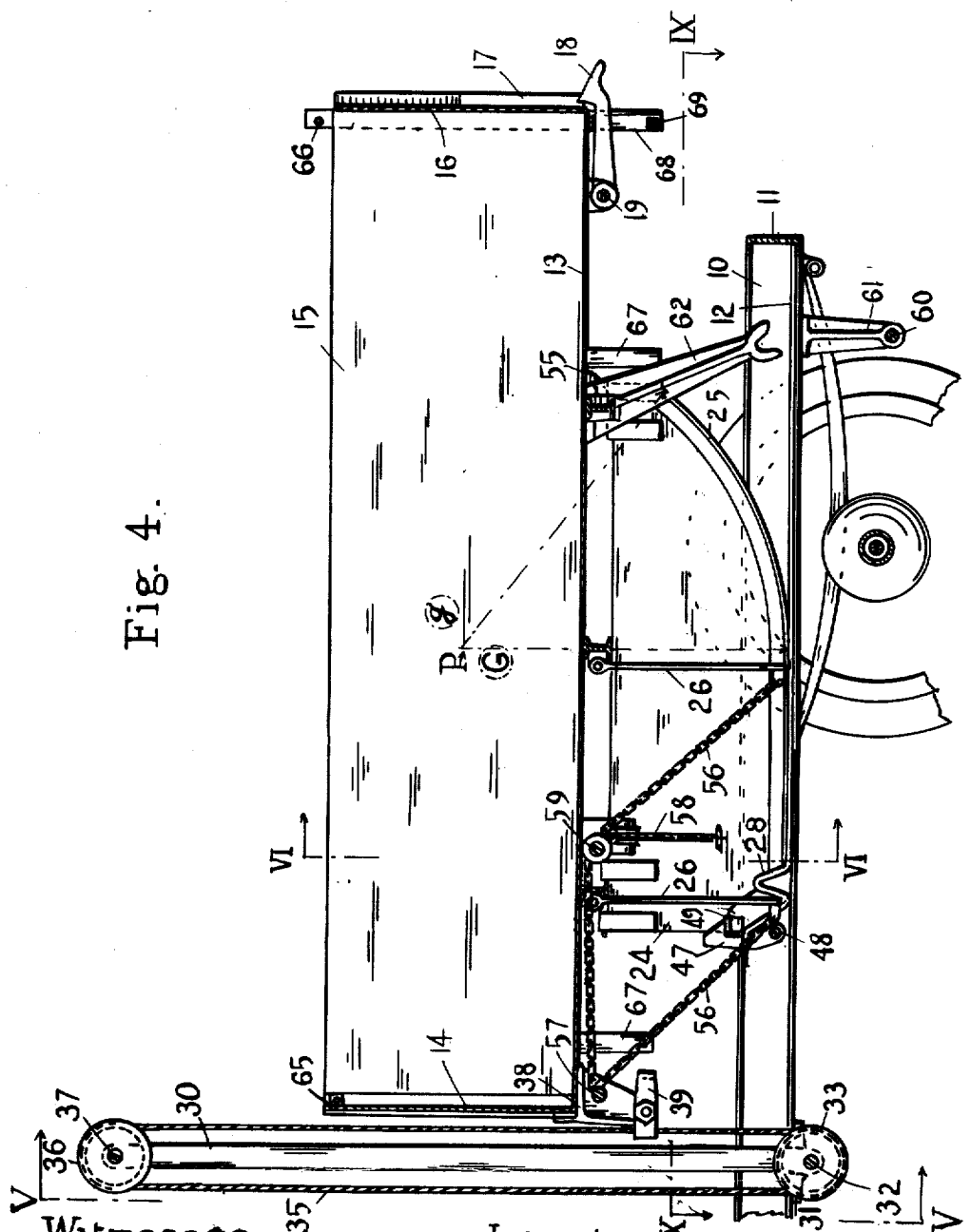
Fig. 4 is a longitudinal section on the lines IV—IV of Figs. 5 to 9.
Figure 5:
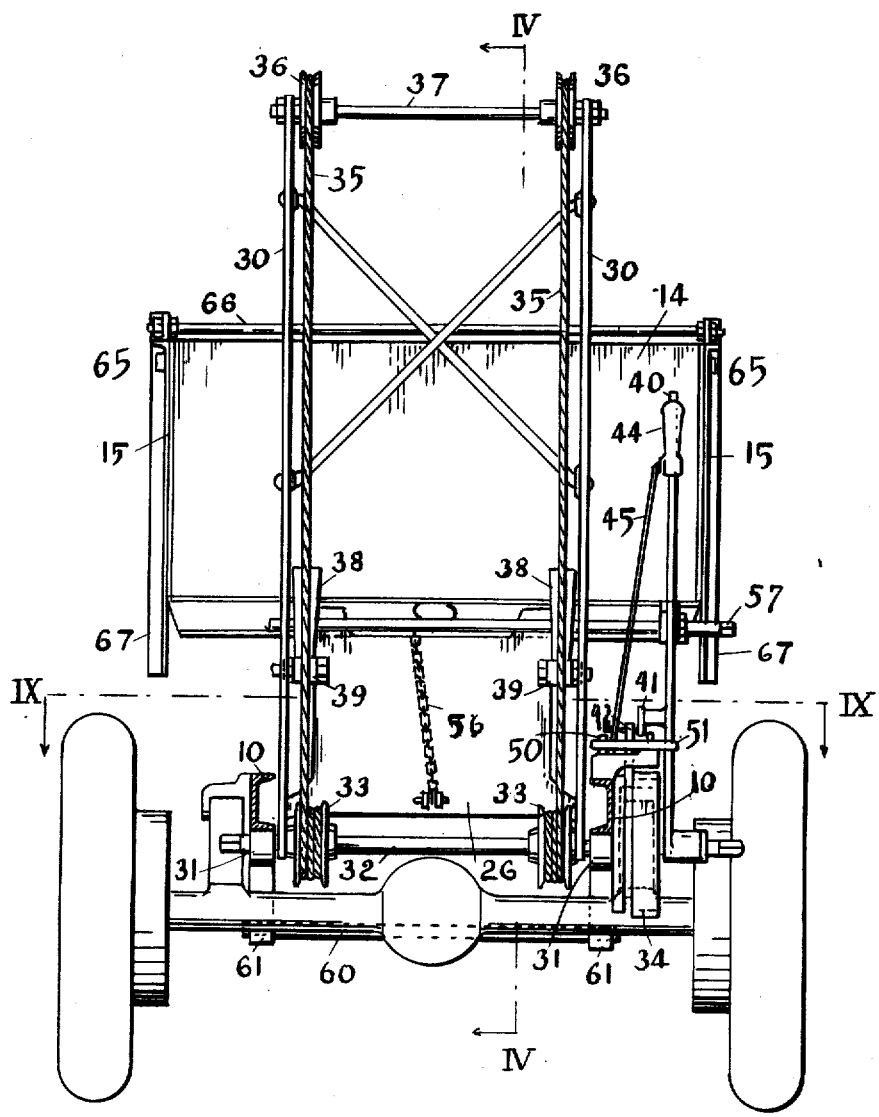
Fig. 5 is a transverse section on the lines V—V of Figs. 1, 4 and 9, certain details behind the cable frame being omitted.
Figure 6:
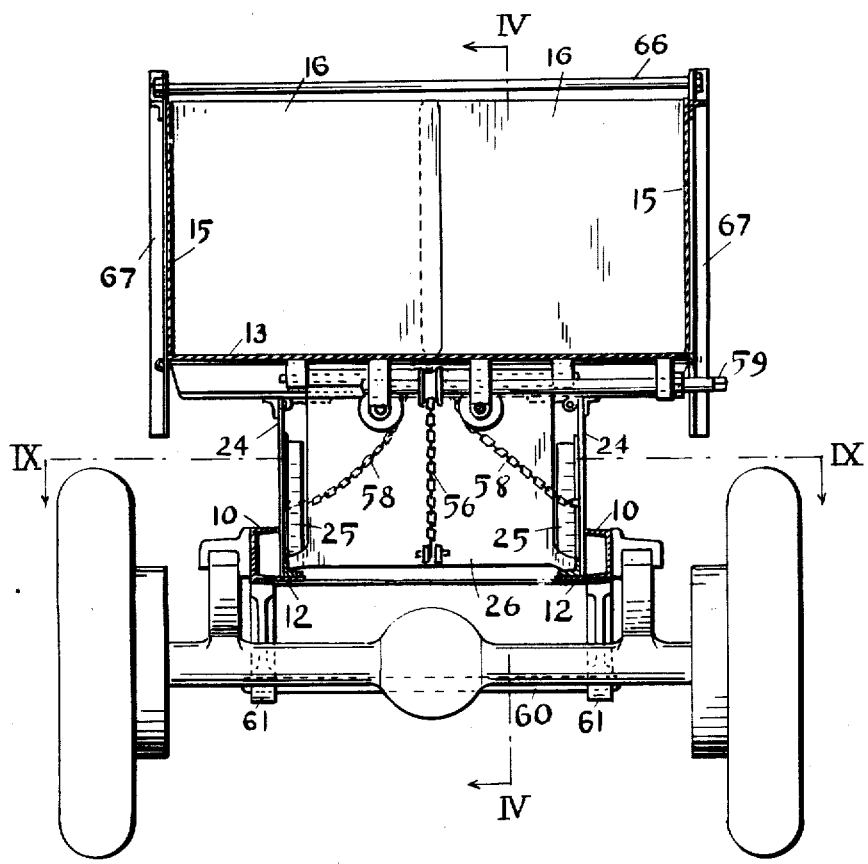
Fig. 6 is a transverse section on the lines VI—VI of Figs. 1, 4 and 9, the rear door operating mechanism being omitted.

As has been indicated above this invention provides for the conversion of a truck embodying the same from a dumping truck to a non-dumping truck. This feature of convertibility is broadly effected by folding the rockers beneath the body and lowering the body from its load carrying position as a dumping truck to a load carrying position directly supported upon the truck frame itself. In this connection compare for example Figs. 1 and 3. It is obvious however, that with the rockers folded and the body in its lower load carrying position manual dumping is still possible by means of the cable mechanism above described.

When the body is in its extreme dumping position curved blocks 55, 55 under the floor of the body bear at the rear ends of the truck frame, and if the forward end of the body is raised slightly above its dumping position by manually turning the shaft 32 of the cable frame the rockers will be lifted clear of the trackways so that they may be folded up toward the floor of the body. While this folding may be done manually without departure from my invention, I have illustrated power means for effecting this. Chains 56, 56 lead from the braces between the rockers to a shaft 57, the rear of these leading over a loose sheave on a shaft 59. One end of the shaft 57 is squared so that a crank may be applied for turning the shaft and winding the chains thereon to fold the braces from between rockers. The braces are cut away above their lower portions to permit of easy folding, and as to the forward brace, to clear the locking lugs 49, 49. When the braces are folded the rockers can be folded. Chains 58, 58 attached to the rockers lead to the shaft 59 which is also squared for the application of a crank to wind these chains thereon. One of the chains is longer than the other so that the rockers will not start to fold at the same time and will not collide in folding and will overlap when folded. Each shaft is provided with a ratchet and pawl for holding the braces and rockers respectively in their folded positions. When the rockers are folded out of the way the body can be lowered by the cables to the position shown in Figs. 3 and 8 and there locked by means of the brake mechanism above described. If desired the braces may be folded before the body is raised to dumping position. Obviously the invention is not limited to the use of a plurality of chains for folding.

It is desirable that in this lower load carrying position the body should be forward of the position to which it would naturally lower if turned on the curved blocks 55, 55 about the rear end of the truck frame as an axis. If it is desired to effect this automatically there may be provided a transverse rod 60 carried by brackets 61, 61 depending from the truck frame, and forked arms 62, 62 depending from the floor of the body for engagement therewith when the body is in dumping position. These continue in engagement so that the rod becomes the axis of movement when the body is turned to its non-dumping position with the rockers folded or returned therefrom. These members also prevent accidental sliding of the body backward or forward on the chassis. While the lowering is effected by gravity it is to be regulated manually from the shaft 32 through the cable mechanism as will be readily understood. In reconverting to an automatic dumping truck the body is raised to dumping position by means of the cables and the rockers and their braces allowed to unfold under control of their folding mechanism.

The second feature of convertibility referred to in the statement of objects of the invention relates to the conversion of the truck from a box body to a platform body. It will be observed in the specific example of the invention shown when the body is in its lower load carrying position, Figs. 3 and 8, the lower portion of the body lies between the truck wheels. This is a common type of truck especially of low tonnage. With such a truck this feature of convertibility is impossible without first raising the body to a supported position above the truck wheels. For this purpose certain other features of my invention afford convenient means. With trucks, however, in which the normal body supports are high and the body projects above and beyond the truck wheels, the convertibility feature now under consideration is applicable to the lower load carrying position of the body and where certain other features of my invention are present also to the upper load carrying position of the body.

To effect the conversion from box body to platform body in the specific example shown the side plates of the body are hinged to the floor and are secured to the front plate by removable bolts 65, 65 and at the rear preferably by a removable tie-rod 66. As this tie-rod may interfere with the discharge of the load in dumping when the material handled is of a character which can not be depended upon to flow freely under it, alternative or auxiliary means are provided. To cooperate with the hinges when the side plates are unfolded to platform position vertical ribs 67, 67 are provided.

These extend below the edges of the side plates when the latter are in box body position and the rear pair of them may be conveniently employed for the purpose now in hand. To this end there are provided diagonal braces 68, 68 pivoted to the floor of the body in line with the said braces which can be moved for engagement therewith and secured thereto by bolts 69, 69. A substantial brace is thus afforded to hold the side plates in their box body position. These braces can be unbolted from the vertical ribs and readily turned out of the way for unfolding the side plates to platform position.

Figure 7:
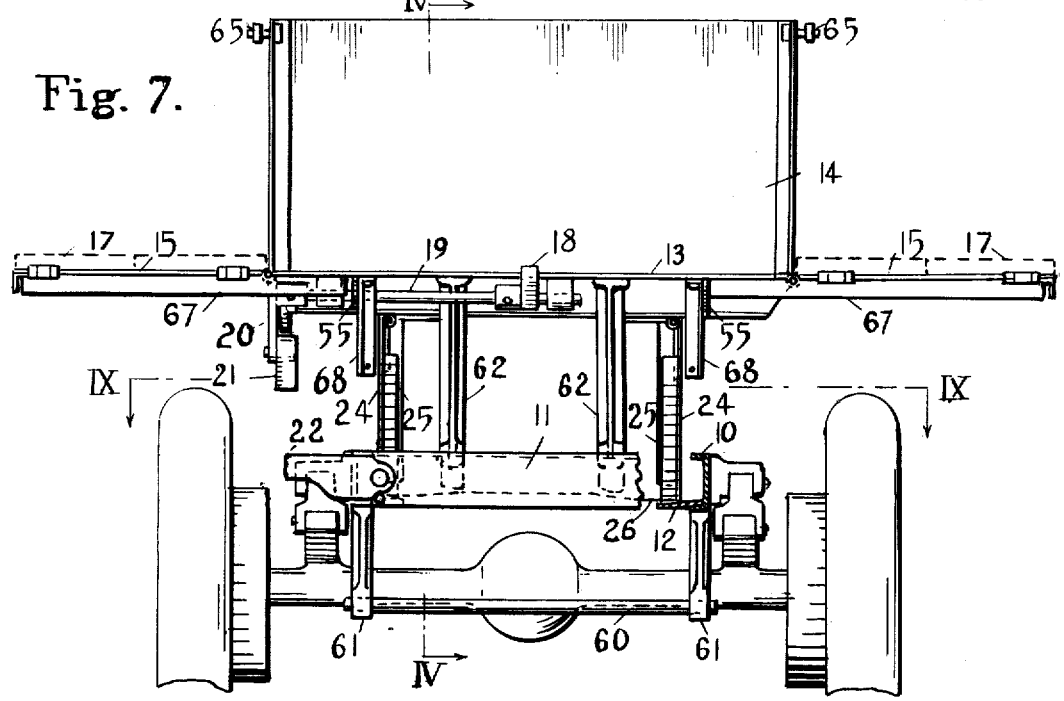
Fig. 7 is a rear elevation showing the body converted to platform form, the cable frame not being shown.

It is thought that the operation of converting from box body to platform body and vice versa will be readily understood without further explanation. The braces are specifically shown in Fig. 8. The manner in which the vertical ribs cooperate with the hinges when the side plates are lowered is illustrated in Fig. 7 wherein they are shown as folding against the under side of the body floor. When the side plates are thus folded down the doors may be detached at their hinges or may be folded over on the side plates as shown in dotted lines in Fig. 7.

The foregoing detailed description has been given for clearness of understanding and no undue limitation should be deduced therefrom, but the appended claims should be construed as broadly as permissible in view of the prior art.

What I claim as new and desire to secure by Letters Patent is:—

1. A dumping truck comprising a frame embodying trackways, a dumping body supported on dependent rockers formed to bear upon the trackways at points forward of the normal center of gravity of the rockers and body when loaded, securing means for maintaining the body in load-carrying position, brake means checking the movement of the body, and means successively releasing the securing means and the brake means.

2. A dumping truck comprising a frame embodying trackways, a dumping body, rockers for supporting the body on the trackways, the relation of curvature of the rockers and the trackways being such that the body when loaded tends to assume dumping position and when empty tends to assume load-carrying position, securing means for maintaining the body in load-carrying position, regulating means for checking movement of the body, and means for releasing the securing means and the regulating means and assuring release of the regulating means subsequently to the release of the securing means, such regulating means being in operative position at the time of the release of the securing means.

3. A dumping truck comprising a frame embodying trackways, a dumping body supported on dependent rockers formed to bear upon the trackways at points forward of the normal center of gravity of the rockers and body when loaded, securing means for maintaining the body in load carrying position, a cable carrier pivoted to the frame, a cable carried thereby and connected with the body, a brake for checking movement of the cable, and means for releasing the securing means while the brake is still applied.

4. A dumping truck comprising a frame embodying trackways, a dumping body supported on dependent rockers formed to bear upon the trackways at points forward of the normal center of gravity of the rockers and body when loaded, securing means for maintaining the body in load carrying position, a cable carrier pivoted to the frame, a cable carried thereby and connected with the body, positive means for effecting movement of the cable, a brake for checking movement of the cable, and means for releasing the securing means while the brake is still applied.

5. A dumping truck comprising a frame embodying trackways, a dumping body, rockers for supporting the body on the trackways, said rockers having a long radius of curvature whereby dumping is effected at a considerable distance from the truck, said rockers being formed to bear upon the trackways at points forward of the normal center of gravity of the rockers and body when loaded, securing means for maintaining the body in load carrying position, a cable carrier pivoted to the frame, a cable carried thereby and connected with the body, a brake for checking movement of the cable and means for releasing the securing means while the brake is still applied.

6. A dumping truck comprising a frame embodying trackways, a dumping body supported on dependent rockers formed to bear upon the trackways at points forward of the normal center of gravity of the rockers and body when loaded, a latch for securing the body in load-carrying position, a brake checking the movement of the body, and an operating lever and connections by which the latch is retracted and the brake released at successive positions of the operating lever.

7. A dumping truck comprising a frame embodying trackways, a dumping body, rockers for supporting the body on the trackways movable into and out of supporting position, removable means for maintaining the rockers in supporting position, and means for supporting the body independently of the rockers in dumping position.

8. A dumping truck comprising a frame embodying trackways, a dumping body, rockers for supporting the body on the trackways movable into and out of supporting position, removable means for maintaining the rockers in supporting position, means for moving the body from load carrying position to dumping position, and means for supporting the body independently of the rockers in dumping position.

9. A dumping truck comprising a frame embodying trackways, a dumping body, rockers for supporting the body on the trackways movable into and out of supporting position, removable braces for maintaining the rockers in supporting position, means for supporting the body independently of the rockers in dumping position, and means for withdrawing the braces and for moving the rockers from their supporting position whereby the body may be supported directly on the frame.

10. A dumping truck comprising a frame embodying trackways, a dumping body, rockers for supporting the body on the trackways movable into and out of supporting position, removable braces for maintaining the rockers in supporting position, means for supporting the body independently of the rockers in dumping position, means for withdrawing the braces and for moving the rockers from their supporting position whereby the body may be supported directly on the frame, and means for controlling the lowering of the body from dumping position to its said position upon the frame.

11. A dumping truck comprising a frame embodying trackways, a dumping body, rockers for supporting the body on the trackways movable into and out of supporting position, removable braces for maintaining the rockers in supporting position, means for moving the body from load carrying position to dumping position, means for supporting the body independently of the rockers in dumping position, means for withdrawing the braces and for moving the rockers from their supporting position whereby the body may be supported directly on the frame, and means for controlling the lowering of the body from dumping position to its said position on the frame.

12. A dumping truck comprising a frame embodying trackways, a dumping body, supporting rockers therefor dependent from the body and hinged thereto and travelling on the trackways, removable braces for holding the rockers in supporting position, means for supporting the body independently of the rockers in its dumping position, shafts carried by the body, connections from the shafts to the braces and rockers, and means for turning the shafts and thereby withdrawing the braces from the rockers and folding the rockers from their supporting position.

13. A dumping truck comprising a frame embodying trackways, a rearwardly dumping body, supporting rockers therefor dependent from the body and hinged thereto and travelling on the trackways, removable braces for holding the rockers in supporting position, means for supporting the body independently of the rockers in its dumping position, transverse shafts carried by the body, connections from the shafts to the braces and rockers, and means accessible from the side of the body for turning the shafts and thereby withdrawing the braces from the rockers and subsequently folding the rockers from their supporting position.

14. A dumping truck comprising a frame embodying trackways, a rearwardly dumping body, supporting rockers therefor dependent from the body and hinged thereto and travelling on the trackways, removable braces for holding the rockers in supporting position, means for moving the body from load carrying position to dumping position, means for supporting the body independently of the rockers in dumping position, transverse shafts carried by the body, connections from the shafts to the braces and rockers, means accessible from the side of the body for turning the shafts and thereby withdrawing the braces from the rockers and subsequently folding the rockers from their supporting position, and means for controlling the lowering of the body from dumping position to a load carrying position upon the frame.

15. A dumping truck comprising a frame embodying trackways, a dumping body, foldable rockers for supporting the body on the trackways, means for controlling the movement of the body from load carrying position to dumping position and from dumping position to load carrying position, and automatic means for controlling the horizontal position of the body on lowering from dumping position with the rockers folded out of supporting position.

16. A dumping truck comprising a frame embodying trackways, a dumping body, foldable rockers for supporting the body on the trackways, means for controlling the movement of the body from load carrying position to dumping position and from dumping position to load carrying position, and automatic means for shifting the body forward on lowering with the rockers folded out of supporting position.

17. A dumping truck comprising a frame embodying trackways, a dumping body, foldable rockers for supporting the body on the trackways, means for controlling the movement of the body from load carrying position to dumping position and from dumping position to load carrying position, and members carried by the frame and by the body which engage when the body is in dumping position and operates to shift the body forward on lowering with the rockers folded out of supporting position.

18. A dumping truck comprising a frame embodying trackways, a dumping body, foldable rockers for supporting the body on the trackways, means for controlling the movement of the body from load carrying position to dumping position and from dumping position to load carrying position, and means for establishing a center of movement for the body in dumping position whereby with the rockers folded out of supporting position the body on lowering will be shifted forward and on being raised will be returned to its original dumping position.

19. A dumping truck comprising a frame embodying trackways, a rearwardly dumping body, foldable rockers for supporting the body on the trackways, a cable carrier pivoted to the frame, a cable carried thereby connected with and capable for supporting the body in dumping position independently of the rockers, and members carried by the frame and by the body which engage when the body is in dumping position and operate to shift the body forward on lowering with the rockers folded out of supporting position.

20. A dumping truck comprising a frame embodying trackways, a rearwardly dumping body, foldable rockers for supporting the body on the trackways, a cable carrier pivoted to the frame, a cable carried thereby and connected with and capable of supporting the frame in dumping position independently of the rockers, positive means for effecting movement of the cable, a brake for the cable, and means carried by the frame and by the body which engage when the body is in dumping position and operate to shift the body forward on lowering with the rockers folded out of supporting position.

21. A dumping truck comprising a frame embodying trackways, a rearwardly dumping body, rockers for supporting the body on the trackways, the relation of curvature of the rockers and the trackways being such that the body when loaded tends to assume dumping position and when empty tends to assume load carrying position, removable braces for maintaining the rockers in supporting position, means for supporting the body independently of the rockers in its dumping position, means for withdrawing the braces and for moving the rockers from their supporting position whereby the body may be supported directly on the frame, means for establishing a center of movement for the body in dumping position whereby with the rockers folded out of supporting position the body on lowering will be shifted forward on the frame and on being raised will be returned to its original dumping position, securing means for maintaining the body in load carrying position, a cable carrier pivoted to the frame, a cable carried thereby and connected with the body, a brake for checking movement of the cable, and means for releasing the securing means while the brake is applied.

22. Control means for a dumping body comprising the combination of means whereby the dumping body is caused to move from one position to another, a latch for securing the body in loading position, a brake for regulating the movement of the body, means for releasing the latch and thereafter releasing the brake, such brake being in operative position at the time of release of the latch.

Signed at New York, N. Y., this 3rd day of November, 1921.

LANDRETH H. KING.

movement of the body from load carrying position to dumping position and from dumping position to load carrying position, and means for establishing a center of movement for the body in dumping position whereby with the rockers folded out of supporting position the body on lowering will be shifted forward and on being raised will be returned to its original dumping position.

19. A dumping truck comprising a frame embodying trackways, a rearwardly dumping body, foldable rockers for supporting the body on the trackways, a cable carrier pivoted to the frame, a cable carried thereby connected with and capable for supporting the body in dumping position independently of the rockers, and members carried by the frame and by the body which engage when the body is in dumping position and operate to shift the body forward on lowering with the rockers folded out of supporting position.

20. A dumping truck comprising a frame embodying trackways, a rearwardly dumping body, foldable rockers for supporting the body on the trackways, a cable carrier pivoted to the frame, a cable carried thereby and connected with and capable of supporting the frame in dumping position independently of the rockers, positive means for effecting movement of the cable, a brake for the cable, and means carried by the frame and by the body which engage when the body is in dumping position and operate to shift the body forward on lowering with the rockers folded out of supporting position.

21. A dumping truck comprising a frame embodying trackways, a rearwardly dumping body, rockers for supporting the body on the trackways, the relation of curvature of the rockers and the trackways being such that the body when loaded tends to assume dumping position and when empty tends to assume load carrying position, removable braces for maintaining the rockers in supporting position, means for supporting the body independently of the rockers in its dumping position, means for withdrawing the braces and for moving the rockers from their supporting position whereby the body may be supported directly on the frame, means for establishing a center of movement for the body in dumping position whereby with the rockers folded out of supporting position the body on lowering will be shifted forward on the frame and on being raised will be returned to its original dumping position, securing means for maintaining the body in load carrying position, a cable carrier pivoted to the frame, a cable carried thereby and connected with the body, a brake for checking movement of the cable, and means for releasing the securing means while the brake is applied.

22. Control means for a dumping body comprising the combination of means whereby the dumping body is caused to move from one position to another, a latch for securing the body in loading position, a brake for regulating the movement of the body, means for releasing the latch and thereafter releasing the brake, such brake being in operative position at the time of release of the latch.

Signed at New York, N. Y., this 3rd day of November, 1921.

LANDRETH H. KING.

Certificate of Correction.

Patent No. 1,639,092.     Granted August 16, 1927, to

LANDRETH H. KING.

It is hereby certified that error appears in the printed specification of the above-numbered patent requiring correction as follows: Page 4, after line 33, insert the following paragraph:

*It is to be noted that claims to the subject-matter of the feature of conversion from a box body to a platform body and for utilizing the sides of the box body as side extensions of the platform, and features of the invention and mechanisms associated therewith are made in my application Sr. No. 199,725, filed June 18th, 1927, as a division hereof;* and that the said Letters Patent should be read with this correction therein that the same may conform to the record of the case in the Patent Office.

Signed and sealed this 4th day of October, A. D. 1927.

[SEAL.]     M. J. MOORE,
*Acting Commissioner of Patents.*

Certificate of Correction.

Patent No. 1,639,092.  Granted August 16, 1927, to

LANDRETH H. KING.

It is hereby certified that error appears in the printed specification of the above-numbered patent requiring correction as follows: Page 4, after line 33, insert the following paragraph:

*It is to be noted that claims to the subject-matter of the feature of conversion from a box body to a platform body and for utilizing the sides of the box body as side extensions of the platform, and features of the invention and mechanisms associated therewith are made in my application Sr. No. 199,725, filed June 18th, 1927, as a division hereof;* and that the said Letters Patent should be read with this correction therein that the same may conform to the record of the case in the Patent Office.

Signed and sealed this 4th day of October, A. D. 1927.

[SEAL.]

M. J. MOORE,
*Acting Commissioner of Patents.*